United States Patent [19]
Sawtell et al.

[11] Patent Number: 5,934,357
[45] Date of Patent: Aug. 10, 1999

[54] SYSTEM FOR MANUFACTURING METAL MATRIX COMPOSITES

[75] Inventors: Ralph R. Sawtell, Mars; Michael S. Cooper, Apollo; Thomas V. Pierce, Delmont; James E. Luzader, Pittsburgh; John J. Connelly, North Huntingdon; Donald P. Hill, Saltsburg, all of Pa.

[73] Assignee: Aluminum Company of America, Pittsburgh, Pa.

[21] Appl. No.: 08/748,668

[22] Filed: Nov. 13, 1996

[51] Int. Cl.⁶ .............................. B22D 17/00; B22D 19/00
[52] U.S. Cl. .......................... 164/303; 164/332; 164/256
[58] Field of Search .................................... 164/303, 332, 164/103, 113, 120, 256

[56] References Cited

U.S. PATENT DOCUMENTS

| | | |
|---|---|---|
| 3,313,917 | 4/1967 | Ditzler et al. . |
| 3,836,751 | 9/1974 | Anderson . |
| 3,903,956 | 9/1975 | Perkrol . |
| 3,982,635 | 9/1976 | Chin et al. . |
| 3,999,915 | 12/1976 | Stepenske . |
| 4,013,193 | 3/1977 | Lorsch . |
| 4,140,211 | 2/1979 | Gibbemeyer . |
| 4,271,895 | 6/1981 | Cole et al. ............................... 164/303 |
| 4,347,889 | 9/1982 | Komatsu et al. . |
| 4,356,907 | 11/1982 | Aidlin et al. . |
| 4,449,905 | 5/1984 | Zulig . |
| 4,533,820 | 8/1985 | Shimizu . |
| 4,540,876 | 9/1985 | McGinty . |
| 4,554,437 | 11/1985 | Wagner et al. . |
| 4,726,415 | 2/1988 | Ueno et al. . |
| 4,798,237 | 1/1989 | Nakano . |
| 4,923,661 | 5/1990 | Russo . |
| 4,932,460 | 6/1990 | High . |
| 5,074,352 | 12/1991 | Suzuki . |
| 5,168,916 | 12/1992 | Doriath et al. . |
| 5,183,096 | 2/1993 | Cook . |
| 5,259,436 | 11/1993 | Yun et al. . |
| 5,315,092 | 5/1994 | Takahashi et al. . |
| 5,375,645 | 12/1994 | Brueker et al. . |
| 5,383,573 | 1/1995 | Balsmio . |
| 5,414,244 | 5/1995 | Imahashi . |
| 5,553,658 | 9/1996 | Cornie ..................................... 164/120 |

FOREIGN PATENT DOCUMENTS

| | | |
|---|---|---|
| 0339789 | 11/1989 | European Pat. Off. . |
| 62-114759 | 5/1987 | Japan . |
| 1586372 | 3/1981 | United Kingdom . |

*Primary Examiner*—Patrick Ryan
*Assistant Examiner*—I.-H. Lin
*Attorney, Agent, or Firm*—Stephen D. Geimer; Edward L. Levine

[57] ABSTRACT

A system for manufacturing metal matrix composites, each including a porous preform infiltrated with molten metal, includes a programmable, automated arrangement for handling preforms for sequential introduction into a die caster of the system. A preform loader includes a reciprocable loading head which receives each preform from an associated stack, and delivers each preform to a horizontally reciprocable carrier of a preform shuttle. The preform shuttle effects indexed movement of each preform along a substantially horizontal path, through a preheating furnace, and into the die caster. Efficient operation of the system is promoted, while undesirable damage to the relatively brittle porous preforms is avoided.

18 Claims, 6 Drawing Sheets

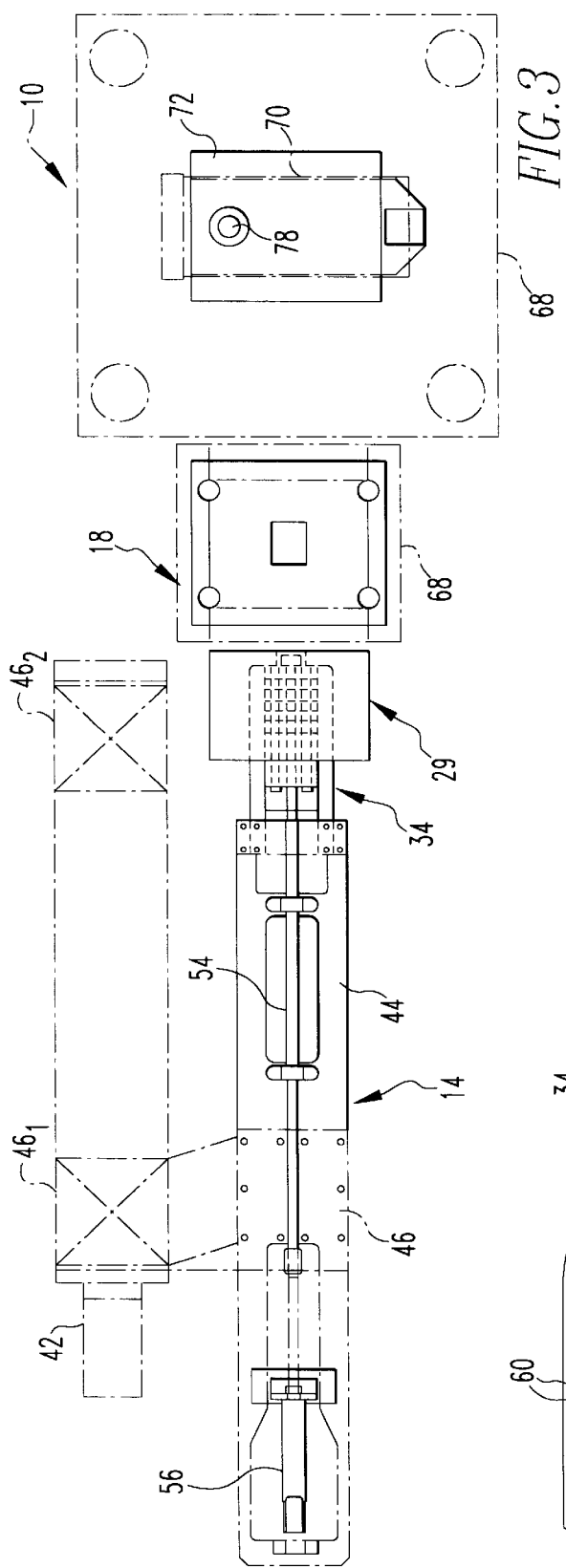

SYSTEM FOR MANUFACTURING METAL MATRIX COMPOSITES

TECHNICAL FIELD

The present invention relates generally to a system for manufacturing metal matrix composites each comprising a preform of non-metallic material infiltrated with molten metal, and more particularly to a highly efficient system for manufacturing such composites, including an automated arrangement for moving each preform through a preheating furnace, and into a die caster for subsequent infiltration with molten metal.

BACKGROUND OF THE INVENTION

Metal matrix composites (sometimes referred to as MMC's) are finding increasingly widespread application in many fields of industry by virtue of the desirable manner in which the properties of such composites can be selectively engineered. These types of composites often comprise a non-metallic porous core, such as comprising ceramic materials, and metallic material which is introduced in a molten state to infiltrate the porous core. The core material may be provided in differing forms, such as particles or fibers, and may comprise up to 80%, or more, of the volume of the resultant composite.

Selection of the specific core materials, as well as the infiltrating metal, permits the physical and mechanical properties of the resultant composite to be selectively engineered. For example, such composites can be engineered to provide desirably high strength-to-weight ratios. A particularly advantageous use of such engineered composites is for mounting and packaging of electronic components, such as integrated circuitry. By appropriate selection of the core material and associated metal, composites exhibiting desirably high coefficients of heat transfer, with desirably low coefficients of thermal expansion, can be readily fabricated.

U.S. Pat. No. 5,259,436, to Yun et al., discloses highly effective techniques for efficient manufacture of metal matrix composites, which can typically be formed with silicon carbide cores infiltrated with molten aluminum or aluminum alloys. A wide variety of core materials, as well as associated infiltrating metallic materials, can be employed in accordance with the teachings of this patent.

In accordance with the teachings of the above-referenced patent, one particularly preferred technique for effecting metal matrix composite manufacture entails preparation of a preform of the material which forms the porous core of the composite, and preheating of the preform prior to its disposition in an associated die caster for infiltration with pressurized molten metal. This formation technique permits the porous core of the composite to be precisely engineered for optimizing the desired physical characteristics of the resultant composite, while at the same time ensuring the structural integrity of the preform during pressurized metal infiltration.

In a particularly preferred technique, a preform is manufactured from particles of silicon carbide, which particles are preferably selected from a plurality of size ranges so that the small particles fill the interstices defined by larger ones of the particles. During blending of the particles, binder materials can be introduced to facilitate shaping of the preform. Heating of this preform is preferably effected to at least partially sinter the particles, and to volatize and drive off any binder materials which may have been applied to the particles. Partial sintering of the preform maintains the desired level of porosity of the composite core, while integrating the particles into a shaped form which can be matched to that of the resultant composite, as desired. The preform typically exhibits sufficient structural integrity to promote its handling, including subsequent disposition in the die caster, without undesired chipping, disintegration, or other damage.

In accordance with the above-referenced patent, infiltration of the preform with molten metal is preferably enhanced by preheating the preform to a temperature at or above the temperature of the molten metal with which the preform is infiltrated. Because this preheating can be effected exteriorly of the die caster, heating of the preform to a temperature greater than that of the molten metal allows for the inevitable cooling that takes place as the preform is moved from the preheating apparatus into the die caster. It is desired that the preform be at a temperature at or above the temperature of the molten metal to promote metal infiltration, and to avoid cooling of the molten metal by the preform prior to substantially complete infiltration. The above patent also contemplates that infiltration can be further enhanced by substantially evacuating the die cavity of the die caster, within which the preform is positioned, thus also evacuating the porous structure of the preform.

The above-referenced U.S. Pat. No. 5,259,436 is hereby incorporated by reference.

The present invention is directed to a system for promoting efficient manufacture of metal matrix composites, with a system including an automated, programmable arrangement for efficiently and sequentially handling porous preforms for preheating, and subsequent positioning in the die cavity of a die caster for molten metal infiltration.

SUMMARY OF THE INVENTION

The present invention is directed to a system for manufacturing metal matrix composites, each of which comprises a preform infiltrated with metal. This system includes a die caster preferably configured to include upper and lower dies which define a die cavity therebetween, and which are relatively vertically movable between an open position for receiving a preform, and a closed position for infiltrating the preform with molten metal. In the preferred form, the upper die of the die caster is movable, while the lower die remains relatively fixed, with the lower die defining a shot port through which molten metal is introduced into the die cavity.

The present system further includes a programmable preform shuttle which acts to effect indexed movement of a porous, non-metallic preform along a substantially horizontal path. Movement in this fashion, particularly when effected in coordination with the vertically openable dies of the associated die caster, has been found to greatly promote efficient manufacture of metal matrix composites. In the preferred embodiment, the horizontal path along which the preform is moved extends toward a position between the open dies of the die caster, preferably just above the fixed lower die. The preform can thus be easily lowered onto the lower die while avoiding damage to the preform, with molten metal infiltration subsequently effected.

In accordance with the illustrated embodiment, the preform shuttle includes a preform carrier which is movable along the substantially horizontal path, with the preform carrier being configured to receive a preform thereon. The shuttle is operable to move the carrier, and the preform thereon, to a position between the upper and lower dies of the die caster for positioning of the preform in the die cavity of the caster for molten metal infiltration.

In the preferred form, the preform shuttle effects indexed movement of the preform carrier from a first position at which the carrier receives the preform from an associated preform loader, to a second position within a preheating furnace of the system, to a third position between upper and lower dies of the die caster. The preheating furnace is preferably positioned immediately adjacent to the die caster, with the second indexed position of the preform carrier being intermediate the first and third positions thereof. This preferred arrangement promotes thermal management of the manufacturing process, since each preform can be preheated to the desired elevated temperature, and then quickly transported to the die caster with minimal heat loss. Infiltration of the preform with pressurized molten metal is thus promoted.

Features of the preform shuttle promote its efficient handling of the porous preforms. In the preferred embodiment, the preform carrier of the shuttle defines an opening within which the preform is positionable for movement with the carrier. The carrier preferably includes at least one movable finger positioned in association with the opening, with movement of the finger effecting release of the preform downwardly from within the opening. In the preferred form, the system includes an arrangement for effecting vertical movement of the preform shuttle, whereby the preform carrier can be lowered before release of the preform by movement of the movable finger. The preform can thus be moved downwardly from the preform carrier, under the influence of gravity, without excessive impact as the preform is positioned on the lower die of the die caster.

As noted, the preform shuttle preferably effects indexed movement of the preform carrier, and the preform position thereon. Preheating of the preform promotes efficient molten metal infiltration, and thus the horizontal path along which the preform is moved by the shuttle preferably extends linearly through the preheating furnace of the system, and beyond the furnace to the die caster preferably positioned immediately downstream thereof. A plurality of upper and lower infrared heating elements are preferably provided in the preheating furnace respectively positioned above and below the horizontal path along which the preform carrier moves, thereby effecting radiant heating of the preform. Notably, the preform carrier is preferably provided with an arrangement for cooling the carrier, provided in the form of one or more coolant-carrying passages, thus avoiding excessive heating of the carrier as the preform is heated to the desired elevated temperature prior to disposition in the die caster. Because the opening in the carrier in which the preform is carried exposes the preform to heating from the upper and lower heating elements of the preheating furnace, rapid and uniform heating of the preform to the desired elevated temperature is promoted.

The present system further includes a programmable arrangement for effecting sequential loading of preforms onto the preform shuttle. The preform loader includes a preform loading head movable generally horizontally and transversely to and above the horizontal path of movement of the preform carrier. In the illustrated embodiment, the loading head of the preform loader moves generally at right angles to the path of movement of the carrier of the preform shuttle, and is preferably operable in a manner which is independent of the operation of the shuttle so that each preform can be positioned by the loader as the preceding preform is being preheated, and subsequently positioned in the die caster.

In the preferred form, the loading head of the preform loader is also vertically movable, and includes an arrangement for selectively applying vacuum to each preform. The loader includes a preform feed magazine which has a vertically movable support platform upon which a vertically arranged stack of preforms can be positioned. The loading head of the loader is operable to hold and grip the uppermost preform of the stack in the feed magazine (by the application of vacuum thereto), and to thereafter move the preform upwardly, horizontally, and thereafter downwardly onto the carrier of the preform shuttle. Release of the vacuum applied by the loading head permits the preform to be positioned in the opening defined by the preform carrier, with the preform supported by the associated one or more movable fingers of the carrier for subsequent preheating, and disposition between the dies of the die caster.

Other features and advantages of the present system will be readily apparent from the following detailed description, the accompanying drawings, and the appended claims.

BRIEF DESCRIPTION OF THE DRAWINGS

FIG. 3 is a diagrammatic view of the preform shuttle, preheating furnace, and die caster of the present manufacturing system;

FIG. 4 is a plan view of a preform carrier of the preform shuttle of the present system.

DETAILED DESCRIPTION

Figure 1:
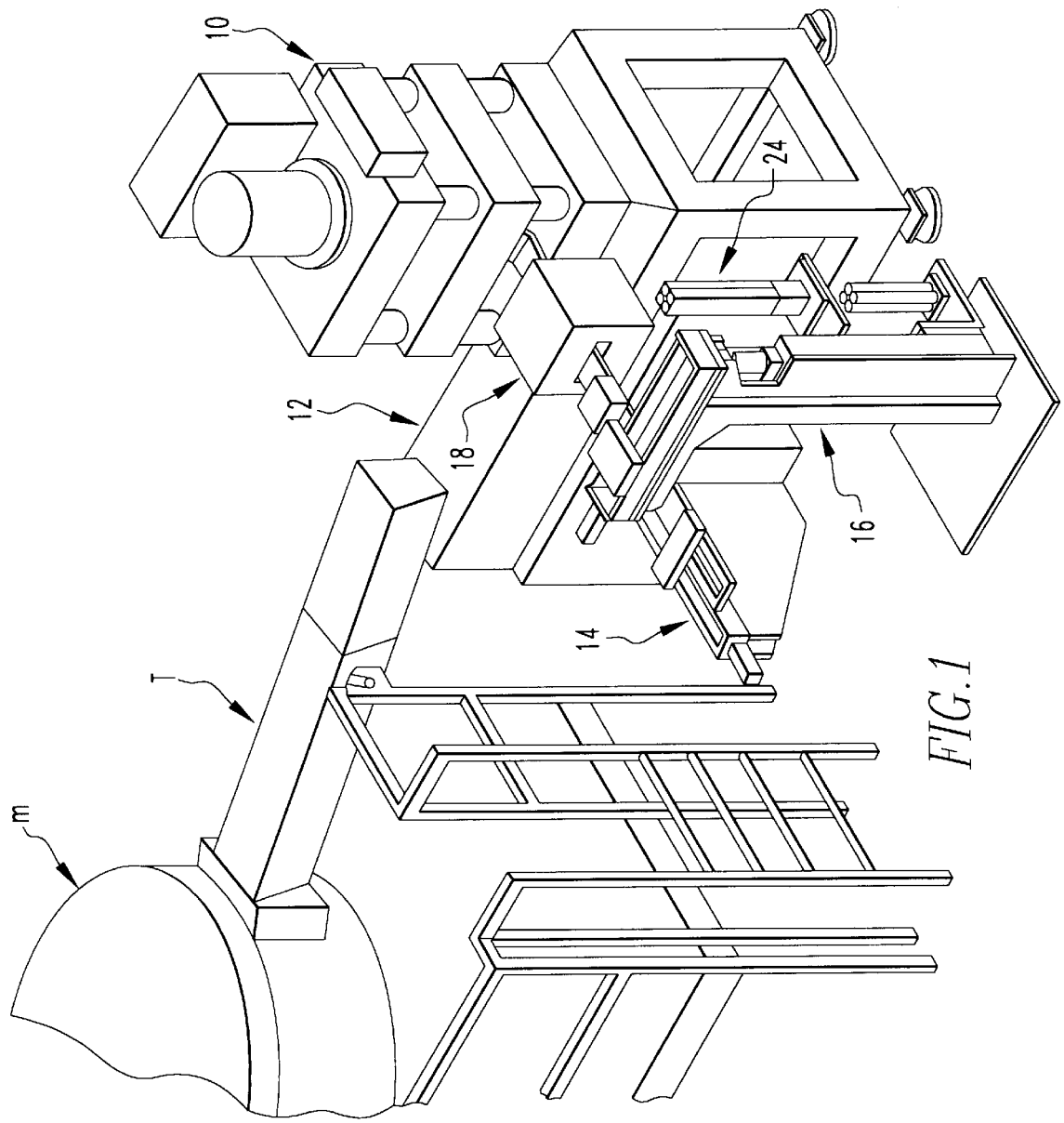
FIG. 1 is a diagrammatic view of a system for manufacturing metal matrix composites embodying the principles of the present invention.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

With reference now to FIG. 1, therein is illustrated a system for manufacturing metal matrix composites embodying the principles of the present invention. In accordance with the present disclosure, metal matrix composites are manufactured by infiltration of porous, typically non-metallic preforms (such as comprising ceramic material) with molten metal, such as aluminum or aluminum alloys. It is within the purview of the present invention that the preforms from which the metal matrix composites are manufactured can be formed from a wide variety of materials, as is known in the prior art, and can be infiltrated with any of a variety of molten metals, as is also known. Appropriate selection of the materials from which the composites are formed, and appropriate proportioning of the relative quantities of porous core materials and infiltrating metal, permit the physical properties of such composites to be desirably engineered for a wide variety of applications, including specialized applications for which both the core material as well as the infiltrating metal, if employed individually would normally prove unsuitable.

As will be further described, the present system includes a die caster 10 which is configured to receive molten metal, such as aluminum or aluminum alloys, from an associated melter M. Molten metal is delivered from the melter via a transfer trough T, and is retained in a molten state within a holding furnace 12 of the die caster 10.

Each metal matrix composite formed with the present manufacturing system includes a porous preform such as comprising partially sintered particles of silicon carbide. The present system includes a programmable, automated arrangement for handling the preforms, wherein each preform is moved from a vertical stack of the preforms onto a preform shuttle, generally designated 14, for subsequent movement along a substantially horizontal path (designated HP) to a position within the die caster 12 for subsequent infiltration with molten metal. Preform loader 16 of the present system effects loading of each preform onto preform shuttle 14, with preheating of each preform to an elevated temperature, preferably at or above the temperature of the molten metal, effected by a preheating furnace 18 through which the preform is moved as it is transported along the substantially horizontal path by the shuttle 14.

As illustrated, the preheating furnace 18 is preferably positioned immediately adjacent to the die caster 10, intermediate the die caster and the preform loader 16. Each preheated preform can thus be rapidly moved from the preheating furnace into the die caster while minimizing heat loss. Preform loader 16 can be simultaneously operated to position the next succeeding preform for disposition on the preform shuttle 14.

Figure 1A:
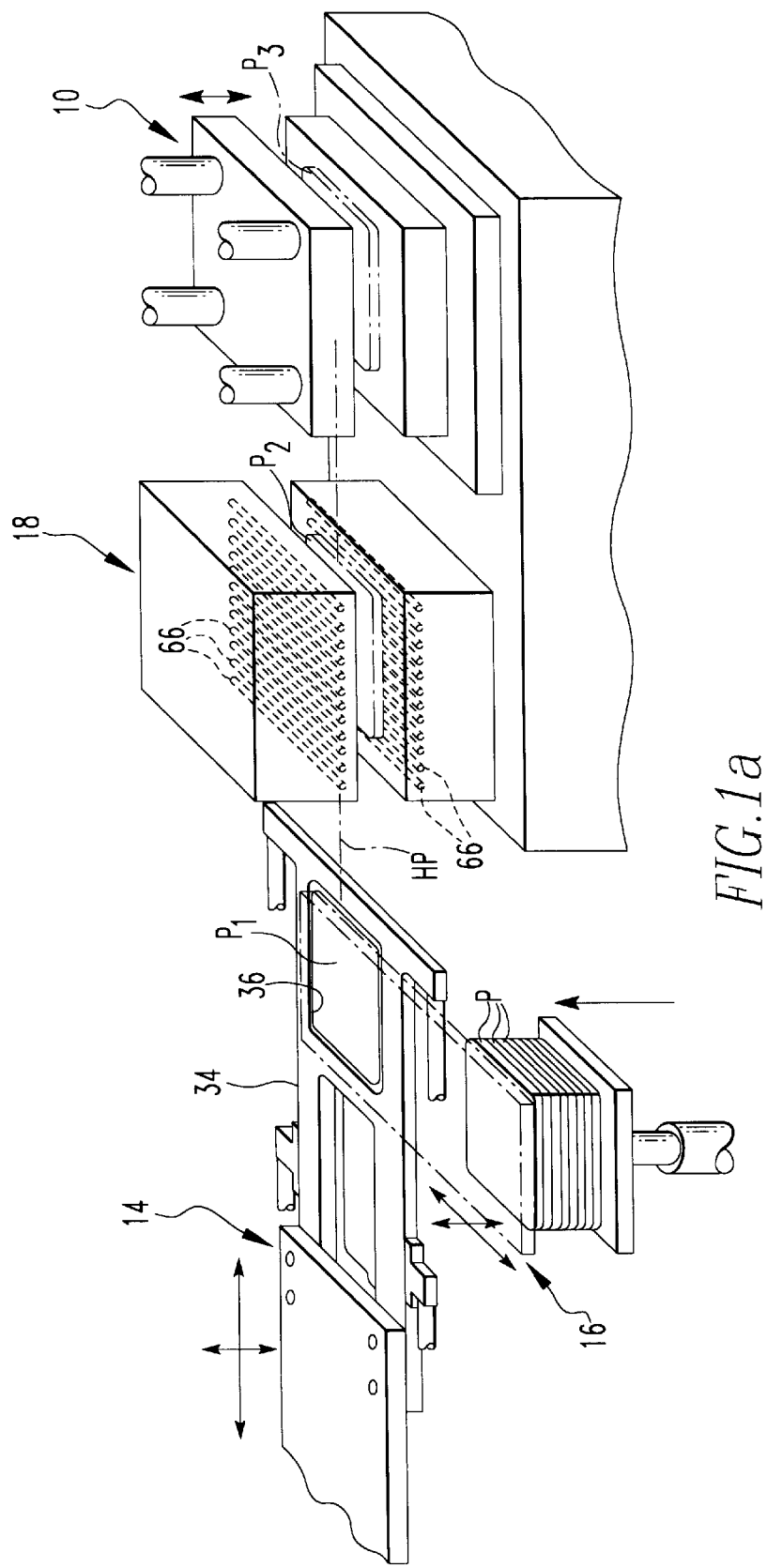
FIG. 1a is a diagrammatic view illustrating the sequence of steps by which the present system effects handling of a preform, and subsequent infiltration with molten metal, for manufacture of a metal matrix composite.

FIG. 1a diagrammatically illustrates handling of each preform, designated P, in accordance with the present system. A plurality of the preforms P are provided in a vertically arranged stack of a feed magazine of the preform loader 16. In accordance with the preferred embodiment of the present invention, and as will be further described, the preform loader effects vertical movement of the uppermost preform from the stack, and thereafter moves the preform horizontally to a position generally above the preform shuttle 14 of the system. The preform loader thereafter lowers the preform P onto a preform carrier of the shuttle, which carrier effects movement of the preform along a substantially horizontal and linear path, preferably by indexed movement, for preheating and infiltration with molten metal. Thus, the preform shuttle 14 effects indexed movement from a first position (designated $P_1$), wherein the carrier of the shuttle receives a preform thereon from the associated preform loader, to a second position (designated $P_2$) wherein preheating of the preform is effected by operative association with preheating furnace 18, to a third position (designated $P_3$) wherein the preform is positioned between dies of the die caster for subsequent metal infiltration.

In the preferred form, the preform shuttle 14 is configured for vertical movement so that each preform is lowered onto a lower one of the molds of the associated die caster, thereby minimizing undesired impact of the relatively brittle, partially sintered preform. In this regard, it is preferred that the horizontal path along which the preform is conveyed extends linearly to a position between the dies of the die caster 10, preferably just above a fixed lower die of the die caster. Relatively limited lowering movement of each preform is thus required for placement on the fixed lower die, thus promoting operating efficiency while avoiding damage to the preforms.

Figure 2:
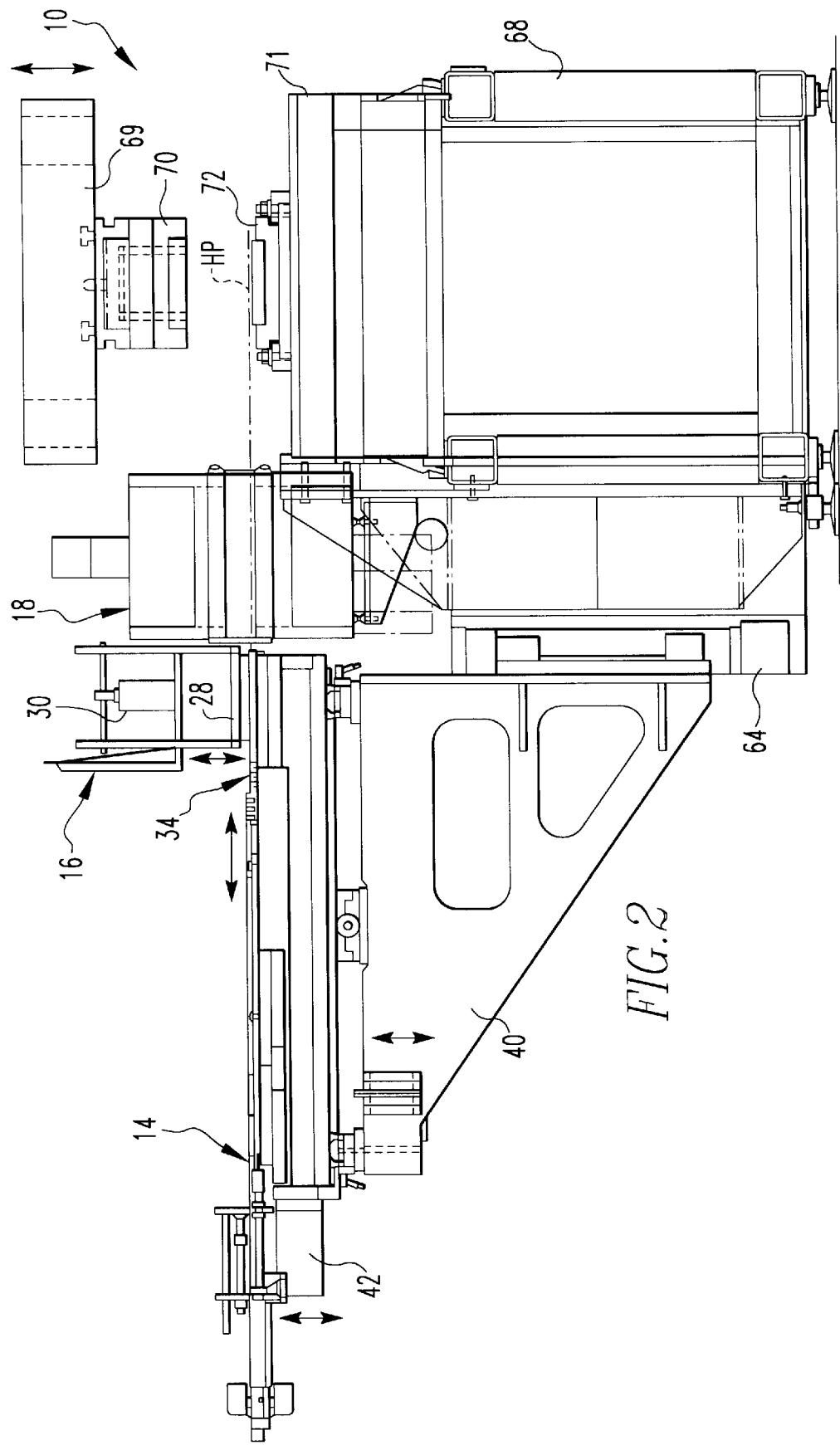
FIG. 2 is a side elevational view illustrating a preform shuttle, a preheating furnace, and portions of an associated die caster of the present manufacturing system.
Figures 2A, 2B:
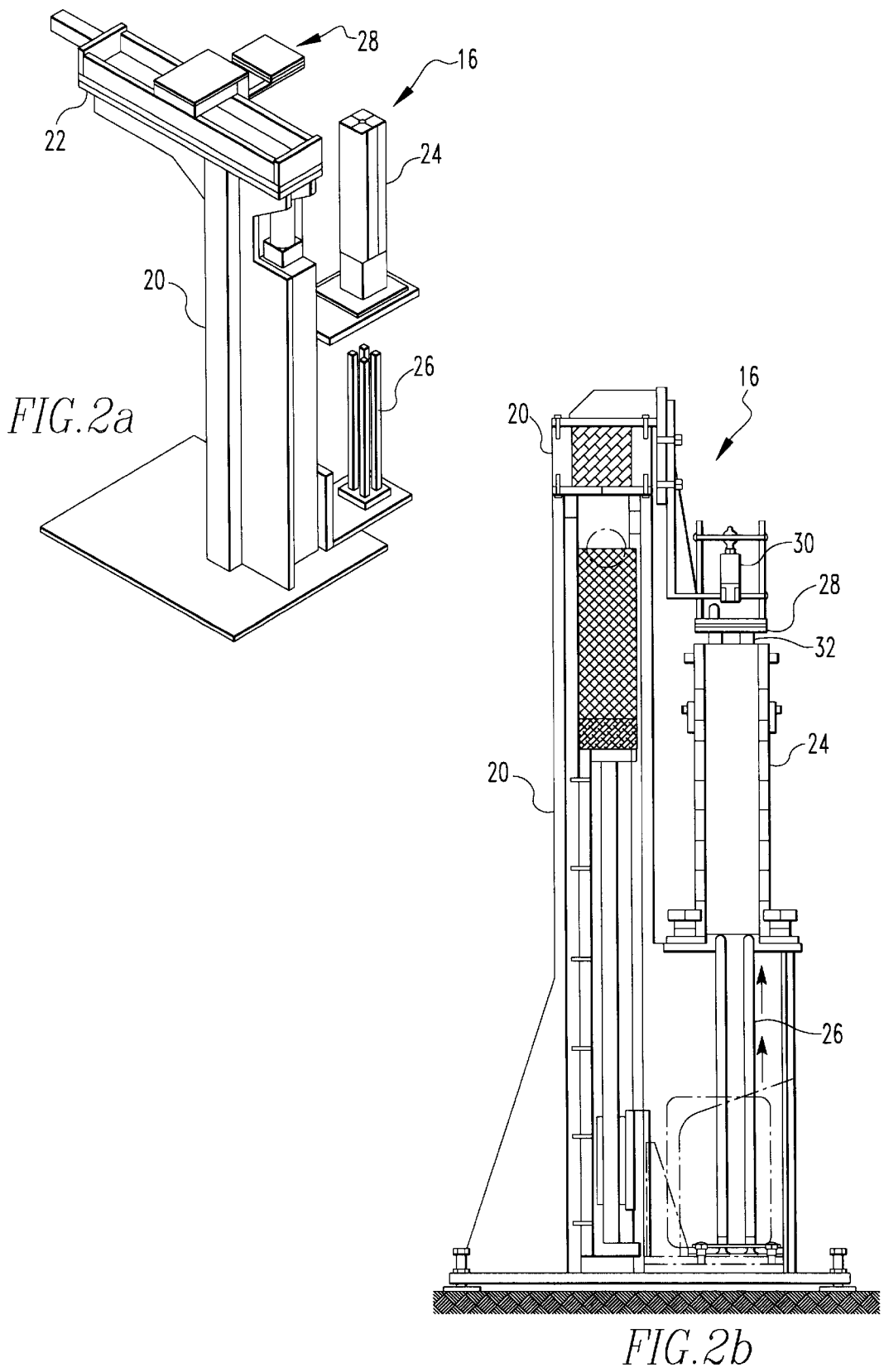
FIGS. 2a and 2b are, respectively, perspective and side elevational diagrammatic views of a preform loader of the present manufacturing system.

With reference to FIGS. 2a and 2b, therein is illustrated the preform loader 16 which initially receives a plurality of preforms for operation of the present system. The preform loader includes a vertically extending vertical support 20, and generally horizontal loader support 22 cantilevered from the vertical support 20 so that the loader support extends generally transversely of and above the associated preform shuttle 14, preferably generally at a right angle thereto.

The loader 16 includes a preform feed magazine 24 which is configured to receive a plurality of the preforms P in a vertically arranged stack. The feed magazine 24 includes a vertically movable support platform 26 which effects vertical movement of the stack of preforms positioned within the feed magazine. In this manner, the uppermost one of the preforms in the stack can be handled by the preform loader for subsequent positioning in association with the preform shuttle of the system. The support platform is operated by suitable drive means, such as by a suitably threaded drive shaft, i.e., a lead screw, with operation by an associated electric stepper motor or the like, via suitable programmable controls. This arrangement permits indexed elevation of the support platform so that the preforms in the stack in the feed magazine are sequentially positioned for subsequent horizontal movement, and placement on the preform shuttle 14.

The preform loader includes a loading head 28 for purposes of moving each preform from the stack in the feed magazine. In the preferred embodiment, as illustrated, the loading head 28 is preferably configured for vertical movement, such as via a suitable actuator 30 linked by support rods joined to the loading head. The loading head 28 preferably includes one or more suction heads 32 (FIG. 2b) for selectively applying vacuum to each preform, for thereby selectively holding and releasing each preform. By this arrangement, the loading head 28 can be lowered, by operation of actuator 30, to move the loading head into position for applying vacuum to the uppermost preform in the stack in the feed magazine 24. The vacuum is thereafter applied to the preform, whereby the preform is held for movement by the loading head 28. Operation of actuator 30 permits the uppermost preform of the stack to be removed from the feed magazine, and thereafter moved into position for receipt by the associated preform shuttle 14. After removal of the uppermost preform from the stack in the feed magazine, the support platform 26 can be operated for indexed upward movement, whereupon the stack of preforms is elevated to present the next preform to the loading head 28.

The preform loader 16 includes a programmable drive arrangement for moving the loading head 28 horizontally along support 22, generally transversely to and above the horizontal path of movement along which preforms are moved by the preform shuttle 14. Such movement can be effected by suitable drive means (not shown), such as a threaded lead screw/stepper motor, or the like.

The preform shuttle 14 will now be described. With particular reference to FIGS. 2, 3, and 4, the preform shuttle 14 includes a preform carrier 34 which defines an opening 36 within which each preform P is received for handling by the shuttle. Because the opening 36 in the carrier exposes both the upper and lower surfaces of the preform for simultaneous heating in the preheating furnace 18, operating efficiency is desirably enhanced.

The shuttle carrier 34 is configured for reciprocable linear movement with respect to a shuttle support frame 40. Programmable, indexed movement of the shuttle carrier 34 can be effected such as by a suitable threaded lead screw or the like, operated via a suitable stepper motor 42. To this end, the shuttle carrier 34 is joined to a carrier plate 44 which in turn is joined to mounting 46 which is reciprocably driven for effecting movement of the shuttle carrier. The range of movement of the shuttle carrier is diagrammatically illustrated in FIG. 3, wherein the mount 46 is illustrated at the opposite ends of its range of motion, as designated by the reference numerals $46_1$ and $46_2$. In a current embodiment of the present system, configured to handle generally flat, thin preforms up to about eight inches by eight inches by 0.25 inches, a range of motion for the carrier 34 of approximately 36 inches is provided.

As noted above, the preform shuttle 14 effects movement of a preform carried by the shuttle carrier 34 through preheating furnace 18, and into a position between dies of die caster 10. Several specific features of the shuttle arrangement promote efficient operation. First, as best illustrated in FIG. 4, the preform P positioned within the opening 36 defined by the carrier 34 is not only positionable within the carrier by downward movement of the loading head 28 of the preform loader 16, but is further movable downwardly from within the opening 36 by operation of at least one, and preferably a plurality of movable fingers 48 positioned generally at, and beneath the opening 36. The movable fingers 48, illustrated as being pivotally movable, each are provided with a plurality of gear teeth, which in turn are in meshing engagement with a respective one of a pair of reciprocable gear racks 50. Thus, reciprocation of the gear racks 50 effects pivotal movement of the movable fingers 48, thus permitting the fingers to be moved to release the preform P from within the opening 36 by downward movement under the influence of gravity. This arrangement facilitates efficient disposition of each preform into the associated die caster. Reciprocable movement of the gear racks 50 is effected via a rack plate 52, which in turn is connected with an actuating rod 54 joined to an actuator 56. As will be observed, the actuator 56, the rod 54, and other components for effecting reciprocable movement of the gear racks are all carried by the reciprocable preform shuttle as the shuttle is driven by drive motor 42.

As noted, each preform P is heated to an elevated temperature, preferably at or above the melting point of the metal with which the preform is infiltrated, by preheating furnace 18. In order to avoid excessive heating of the preform carrier 34, the carrier is preferably provided with an arrangement for effecting cooling thereof. In the illustrated embodiment, the carrier defines coolant passages 58 which are supplied with coolant such as compressed air via suitable coolant lines 60. Temperature sensors 62 can be provided for monitoring coolant temperatures.

Careful handling of the relatively brittle preforms P is promoted by avoiding excessive impacts upon each preform. Thus, while the preform carrier 34 is preferably configured to release each preform from the opening 36 therein by downward movement by gravity (upon release by movable fingers 48), the present system is preferably configured to effect vertical movement of the preform carrier 34 by effecting vertical movement of the preform shuttle 14. To this end, shuttle support frame 40 (FIG. 2) is vertically movable such as by the use of a vertically oriented lead screw driven by a suitable stepper motor 64. In practice, this permits the preform carrier to be lowered to a position immediately above the lower die of the associated die caster 10, prior to operation of movable fingers 48 to release the preform carried thereby. Gentle handing of each preform is thus accomplished. Preheating furnace 18, including the lower heating elements thereof, is configured to provide sufficient clearance during this lowering movement of the preform shuttle.

Indexed movement by the preform shuttle 14 is preferably effected such that each preform is moved into operative association with the preheating furnace 18 by movement of each preform along a substantially horizontal path which extends through the preheating furnace. The preheating furnace preferably includes a plurality of upper and lower infrared heating elements 66 (FIG. 1a) which, in a current embodiment, preferably comprise twelve (12) upper and twelve (12) lower 2,000 watt heating elements, each one comprising an infrared heater such as Model No. GE-000-43168-22790 (Infrared lamp, 240V, 2,000 W, clear quartz bulb), available from General Electric Company. This results in the presently preferred embodiment of the preheating furnace 18 is delivering an output of 24 kilowatts or greater. This relatively high level of output permits each preform P to be heated to the desired elevated temperature (typically on the order of 1,500°–1,800° F.) in a relatively short period of time, on the order of 10 seconds or less, thus promoting highly efficient operation of the present system. It is within the purview of the present invention that alternate preheating means can be employed, such as a suitably sized microwave heating apparatus.

Figure 5:
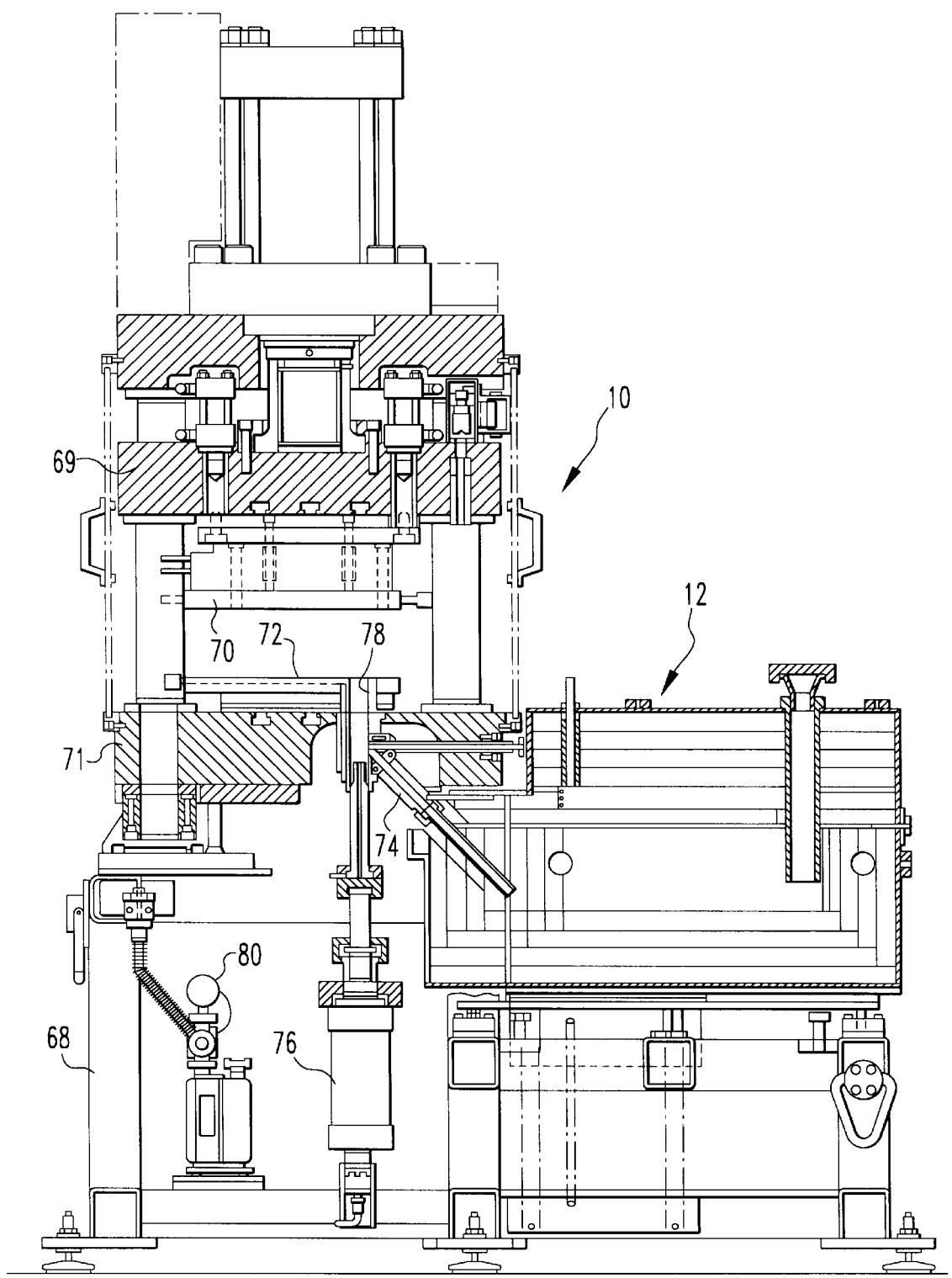
FIG. 5 is a side elevational view of the die caster of the present manufacturing system.

With further reference to FIGS. 2, 3, and 5, the die caster 10 of the present system will now be described. In many respects, the die caster 10 may be conventionally configured, but preferred features of its construction facilitate its efficient use with the above-described preform loader, preform shuttle, and preheating furnace.

The die caster 10 includes a frame 68 upon which an upper die 70 and a lower die 72 are respectively mounted on upper and lower platens 69, 71 for relative vertical movement, preferably by movement of upper die 70 while lower die 72 remains fixed. Molten metal from holding furnace 12 is delivered via supply conduit 74 for introduction into the die cavity defined by the upper and lower dies 70, 72. High-pressure introduction of the molten metal (at pressure up to 10,000 psi) into the die cavity is effected by actuator 76, operating through a preferably internally cooled piston. As best shown in FIG. 5, molten metal is delivered through a shot port 78 defined by the lower die 72. Internal cooling of the piston that pressurizes and drives molten metal into the die cavity defined by the upper and lower dies (within which die cavity each preform P is positioned for molten metal infiltration) facilitates efficient operation by acting to remove heat and solidify the so-called "biscuit" of metallic material which forms generally at the juncture of shot port 68 with the die cavity. This biscuit of material is removed from the die cavity together with the metal-infiltrated preform, with removal of the biscuit from the metal matrix composite thus formed normally effected during subsequent machining and finishing. Ejection of the composite component from within the die cavity is preferably effected by suitable ejector pins operating through the vertically movable upper die 70.

Infiltration of molten metal into each preform P is enhanced by substantially evacuating the interior of the die cavity, subsequent to disposition of a preform between the upper and lower dies, and closing of the dies. Vacuum pump 80 mounted on the frame of the die caster is operatively connected, via suitable tubing (not shown) for effecting such evacuation.

From the foregoing, it will be observed that numerous modifications and variations can be effected without departing from the true spirit and scope of the novel concept of the present invention. It is to be understood that no limitation with respect to the specific embodiment illustrated herein is intended or should be inferred. The disclosure is intended to cover, by the appended claims, al such modifications as fall within the scope of the claims.

What is claimed is:

1. A system for manufacturing metal matrix composites each comprising a preform infiltrated with metal, comprising:

a die caster having upper and lower dies defining a die cavity therebetween, said upper and lower dies being relatively movable between an open position for receiving a preform, and a closed position for infiltrating the preform with molten metal; and a preform shuttle supporting a preform canier movable in a substantially horizontal path, said preform carrier being configured to receive a preform thereon, said preform carrier defining an opening within which the preform is carried, said carrier including at least one movable finger positioned beneath said opening to support the preform therein, said movable finger being movable to release the preform from within said opening, said shuttle being operable to move said carrier and the preform thereon to a position between said upper and lower dies of said die caster so that upon release of said preform the preform moves by gravity onto the lower die of said die caster and positions the preform in said die cavity for infiltration with molten metal upon removal of said carrier from said position between said upper and lower dies by said shuttle.

2. A system for manufacturing metal matrix composites in accordance with claim 1, wherein said movable finger includes gear teeth, said preform shuttle including at least one reciprocable gear rack in meshing engagement with the gear teeth of said movable finger whereby reciprocation of said gear rack effects movement of said movable finger.

3. A system for manufacturing metal matrix composites in accordance with claim 1, including means for vertically said preform carrier so that said carrier can be removed downwardly toward said lower die before said movable finger is moved to release the preform from within said opening onto said lower die.

4. A system for manufacturing metal matrix composites in accordance with claim 3, wherein said means for vertically moving said preform carrier comprises means for vertically moving said preform shuttle, including said preform carrier.

5. A system for manufacturing metal matrix composites in accordance with claim 1, including a preform loader having a preform loading head movable generally transversely to the horizontal path of movement of said preform carrier for positioning the preform on said preform carrier for subsequent movement to the position between said upper and lower dies.

6. A system for manufacturing metal matrix composites in accordance with claim 5, wherein said preform loader includes a preform feed magazine for holding a vertically arranged stack of said preforms, said feed magazine including a vertically movable supporting platform for selectively elevating the stack of preforms so that the uppermost preform of said stack is positioned for movement by said loading head of said preform loader.

7. A system for manufacturing metal matrix composites in accordance with claim 5, wherein said preform loader includes means for vertically moving said loading head so that the preform can be lowered onto said preform carrier of said preform shuttle.

8. A system for manufacturing metal matrix composites in accordance with claim 7, wherein said loading head includes means for selectively applying vacuum to the preform so that the loading head can selectively hold and release the preform.

9. A system for manufacturing metal matrix composites in accordance with claim 1, wherein said die caster includes means for moving said upper die for relatively moving said upper and lower dies, said lower die defining a shot port through which molten metal is introduced into said die cavity for infiltrating the preform therein.

10. A system for manufacturing metal matrix composites in accordance with claim 1, including a preform preheating furnace for preheating the preform before positioning between the upper and lower dies of said die caster, said preform carrier of said preform shuttle and the preform thereon being movable into operative association with said preheating furnace for preheating the preform prior to movement of said preform carrier and the preform to the position between said upper and lower dies.

11. A system for manufacturing metal matrix composites in accordance with claim 10, wherein the substantially horizontal path along which said preform carrier is movable extends through said preheating furnace for moving the preform on the carrier into operative association with the preheating furnace.

12. A system for manufacturing metal matrix composites, each comprising a preform infiltrated with metal, comprising:

a die caster having a pair of dies defining a die cavity therebetween, said dies being relatively movable between an open position for receiving a preform, and a closed position for infiltrating the preform with molten metal;

a preform shuttle supporting a preform carrier movable in a substantially linear path, said preform carrier being configured to receive a preform thereon by disposition of the preform within an opening defined by said carrier, said preform carrier including means for releasing said preform from within said opening for positioning the preform between said pair of dies of said die caster to position the preform in said die cavity;

a preform loader having a preform loading head movable generally transversely to the linear path of movement of said preform carrier for positioning the preform on said preform carrier, said preform loader including a preform feed magazine for holding a plurality of said preforms, said feed magazine including means for feeding one of said plurality of said preforms to a position for movement by said loading head for positioning said preform on said preform carrier; and a preform preheating furnace for preheating the preform before positioning between the dies of said die caster, said substantially linear path of movement of said preform carrier extending through said preheating furnace for preheating the preform prior to movement of the preform carrier and preform thereon to the position between the dies of said die caster.

13. A system for manufacturing metal matrix composites in accordance with claim 12, wherein said preform loader includes means for vertically moving said loading head, and said loading head includes means for selectively applying vacuum to the preform to selectively hold and release the preform.

14. A system for manufacturing metal matrix composites in accordance with claim 13, wherein said pair of dies of said die caster are movable vertically relative to each other, said system including means for vertically moving said preform shuttle to vertically move said preform carrier so that said carrier and the preform thereon can be moved downwardly toward a lower one of said dies before said releasing means are operated to release the preform from within the opening defined by said preform carrier.

15. A system for manufacturing metal matrix composites each comprising a preform infiltrated with metal, comprising a die caster having upper and lower dies defining a die cavity therebetween, said upper and lower dies being relatively movable, by movement of said upper die, between an open position for receiving a preform, and a closed position for infiltrating the preform with metal, said lower die defining a shot port through which molten metal is introduced into said die cavity for infiltrating the preform therein;

a preheating furnace for preheating the preform, through effecting radiant heating of the preform, before the preform is positioned between the upper and lower dies of said die caster, said preheating furnace including a plurality of upper and lower infrared heating elements respectively positioned above and below a substantially horizontal path extending through said preheating furnace for said effecting radiant heating of said preform;

a preform shuttle supporting a preform carrier movable along said substantially horizontal path extending through said preheating furnace, said preform carrier defining an opening within which said preform is positionable so that the preform is carried on said carrier with upper and lower surfaces of the preform exposed, said carrier including at least one movable finger means positioned at said opening so that movement of said finger releases the preform downwardly from within said opening and onto said lower die of said die caster after the preform is preheated in said preheating furnace; and a preform loader having a preform loading head movable generally horizontally and transversely to and above the horizontal path of movement of the preform carrier, said preform loader including means for vertically moving said loading head, with said loading head including means for selectively applying vacuum to the preform to selectively hold and release the preform so that the preform can be moved by the loading head to a position above said preform carrier, and lowered by movement of said loading head into said opening defined by said preform carrier for subsequent preheating and positioning in said die caster for infiltration with molten metal.

16. A system for manufacturing metal matrix composites in accordance with claim 15, wherein said preform carrier includes means for effecting cooling of said carrier to prevent excessive heating of said carrier by said preheating furnace.

17. A system for manufacturing metal matrix composites in accordance with claim 15, wherein said preform shuttle effects indexed movement of said preform carrier from a first position for receiving the preform from said preform loader, to a second position within said preheating furnace for preheating the preform, to a third position between said upper and lower dies of said die caster, wherein said second position is intermediate said first and third positions.

18. A system for manufacturing metal matrix composites in accordance with claim 17, including means for vertically moving said preform carrier in said third indexed position thereof so that the preform carrier can be moved downwardly toward said lower die before said movable finger means is moved to release said preform from within the opening defined by said preform carrier.

* * * * *